No. 680,217. Patented Aug. 13, 1901.
J. R. BLAKESLEE.
RIVET MAKING MACHINE.
(Application filed June 16, 1900.)
(No Model.) 8 Sheets—Sheet 1.
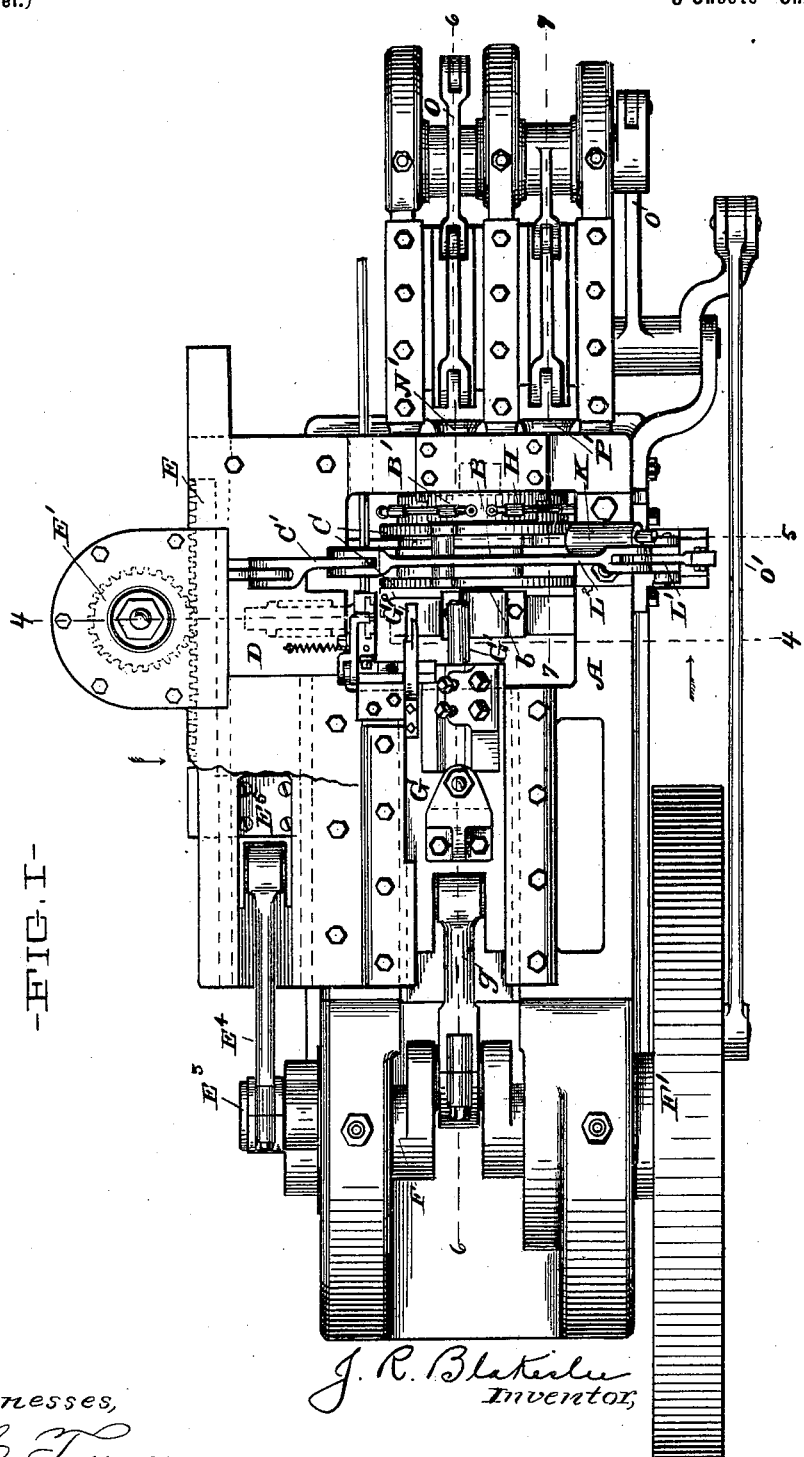
FIG. I.
Witnesses, J. R. Blakeslee, Inventor,
By J. D. Fay, Atty.

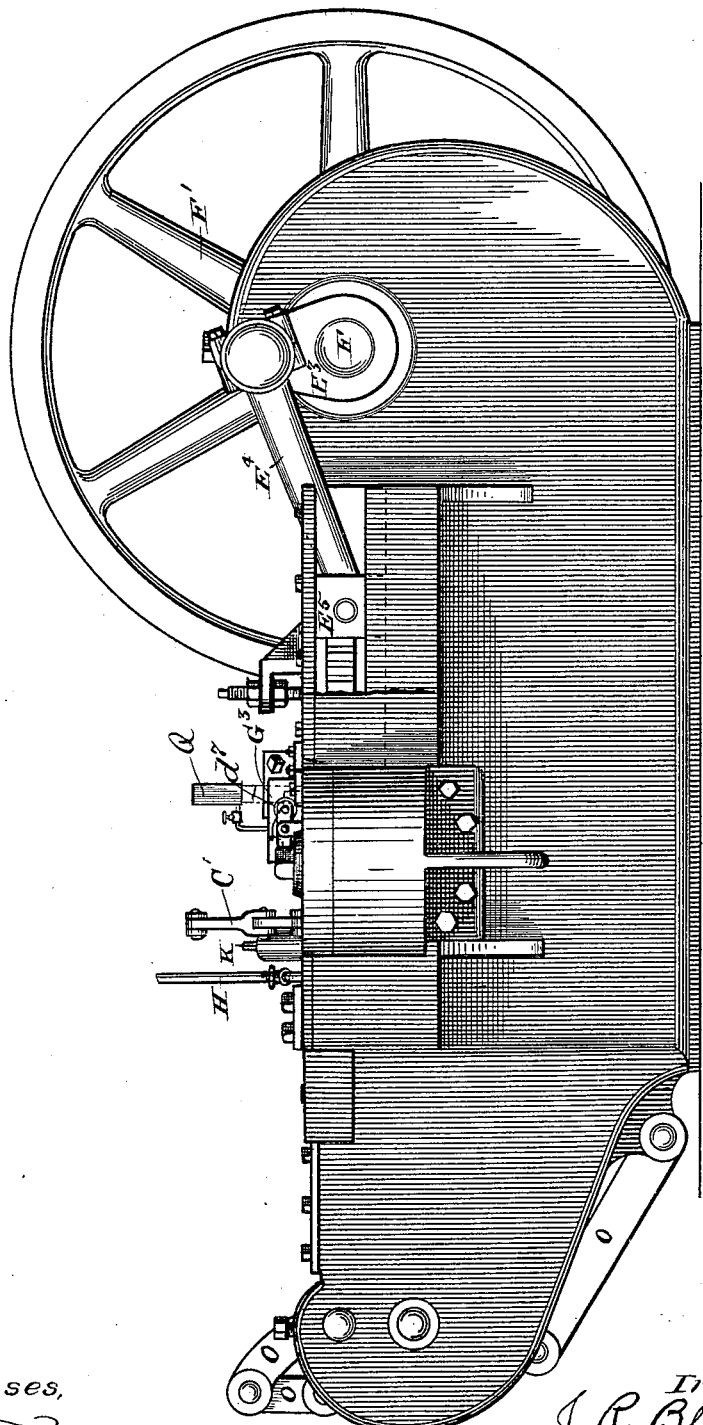

No. 680,217. Patented Aug. 13, 1901.
J. R. BLAKESLEE.
RIVET MAKING MACHINE.
(Application filed June 16, 1900.)
(No Model.) 8 Sheets—Sheet 3.
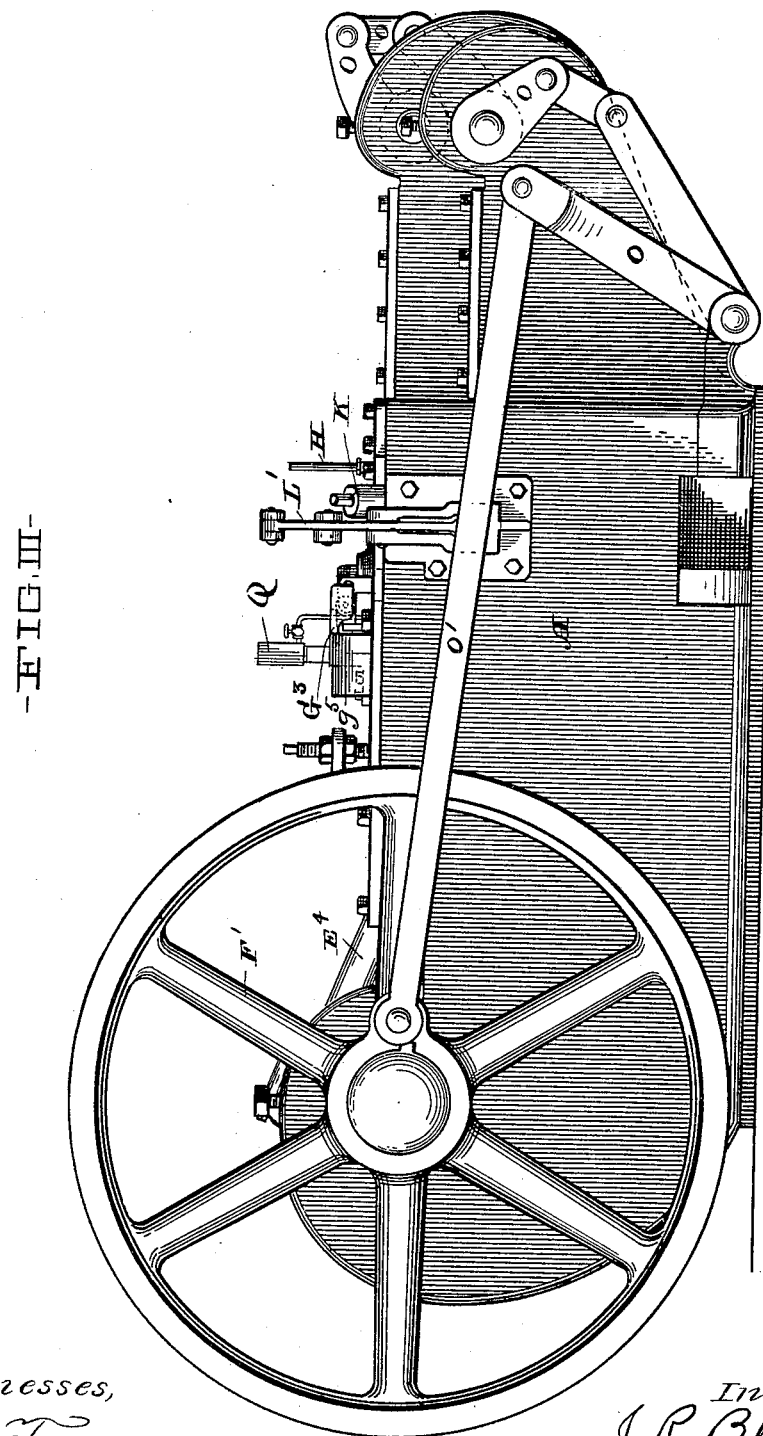
FIG. III.
Witnesses,
J. C. Turner
N. C. Merkel
Inventor,
J. R. Blakeslee
By J. D. Fay
Atty.

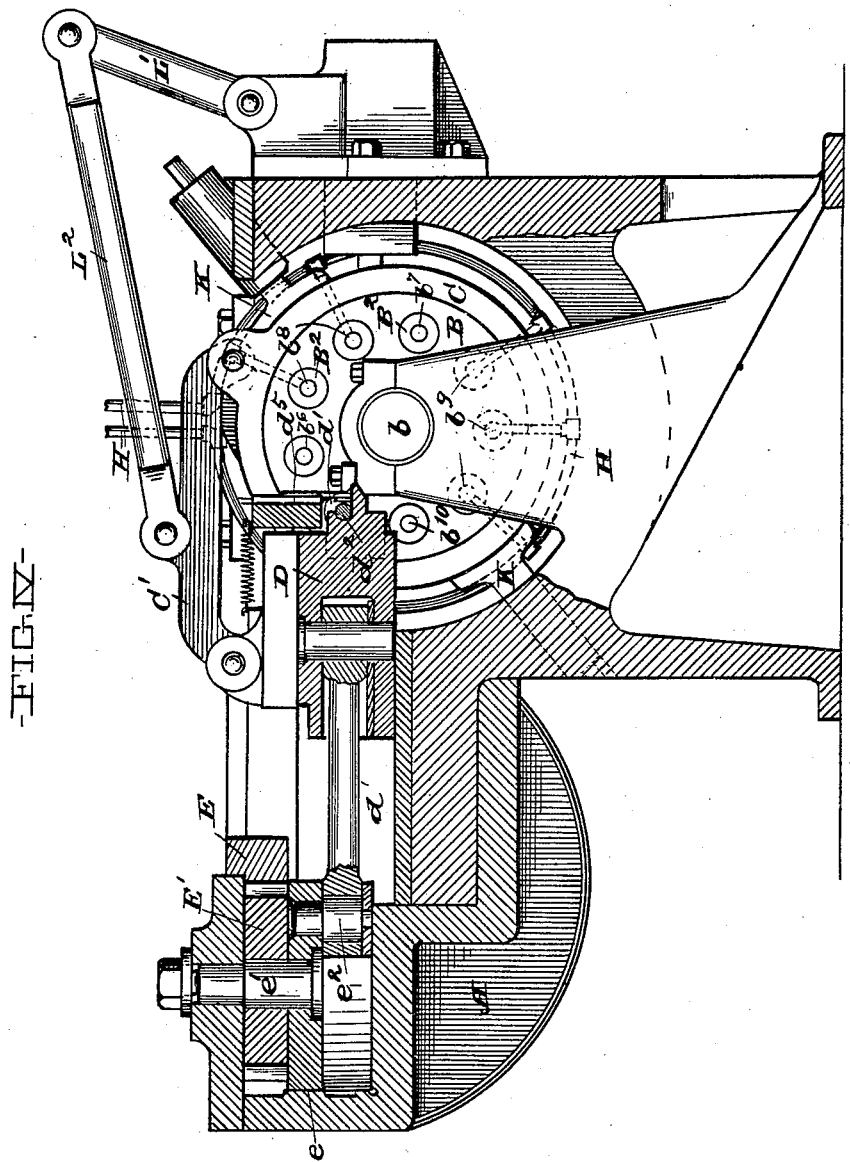

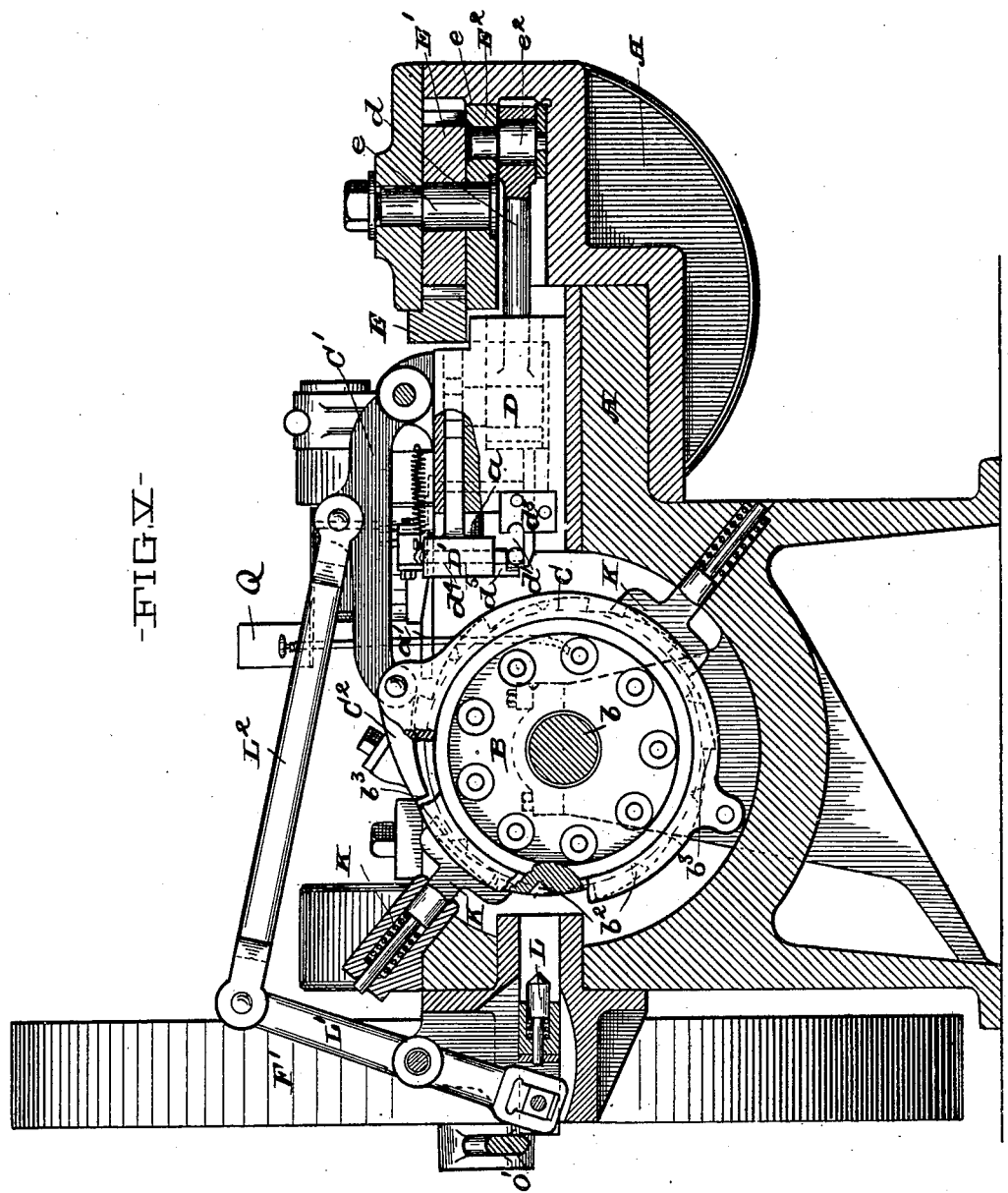

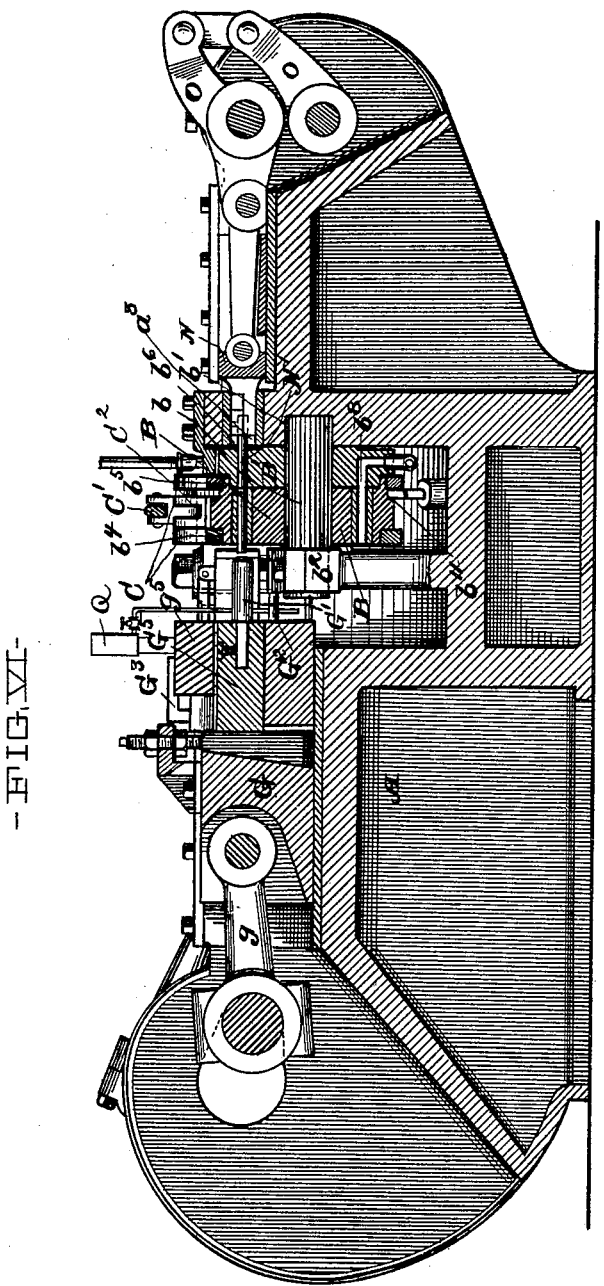

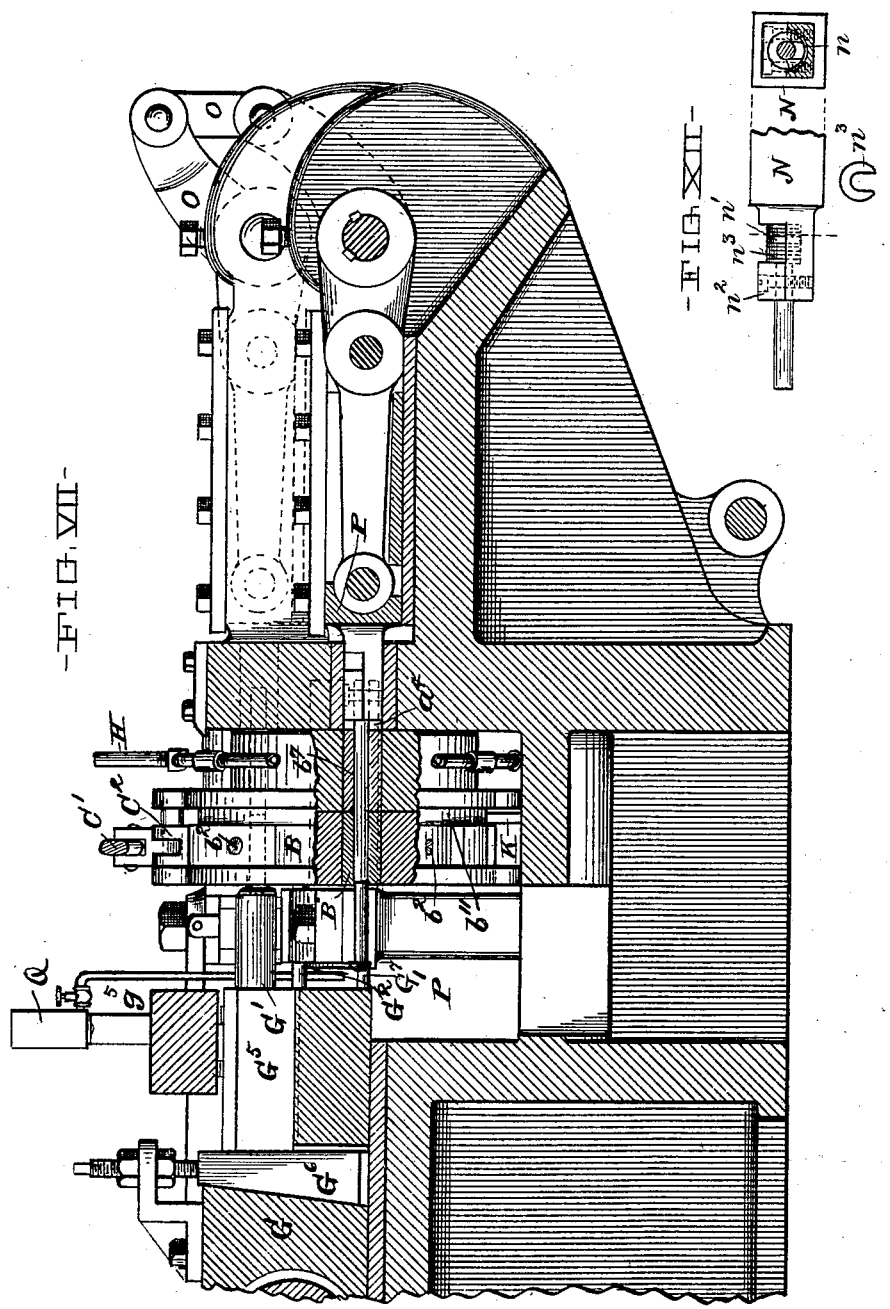

No. 680,217. Patented Aug. 13, 1901.
J. R. BLAKESLEE.
RIVET MAKING MACHINE.
(Application filed June 16, 1900.)
(No Model.) 8 Sheets—Sheet 8.
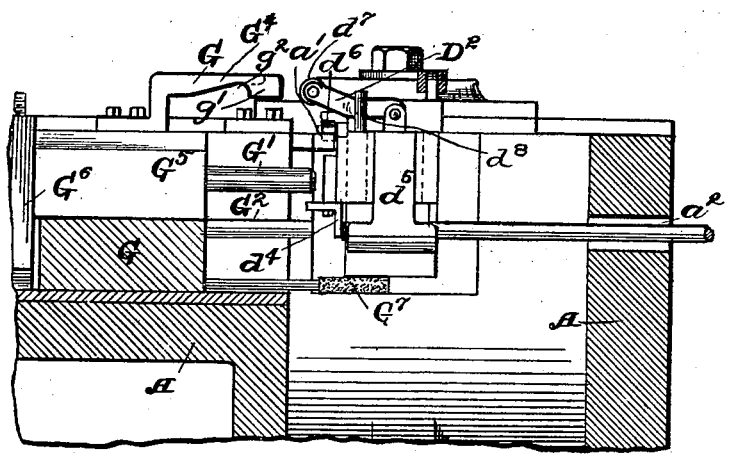
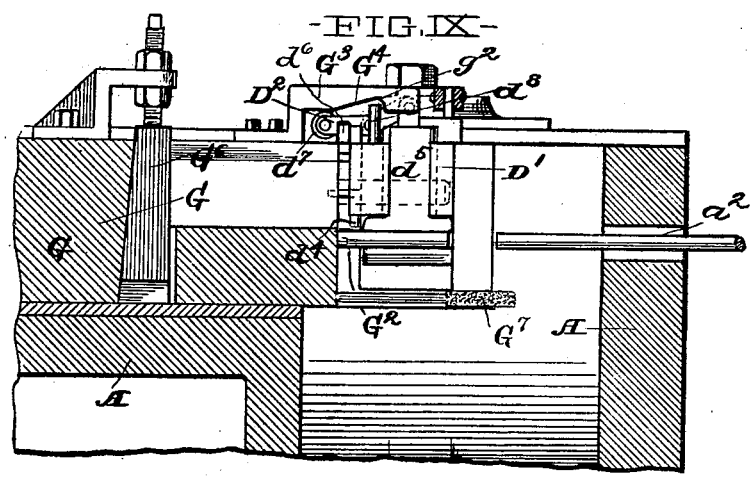
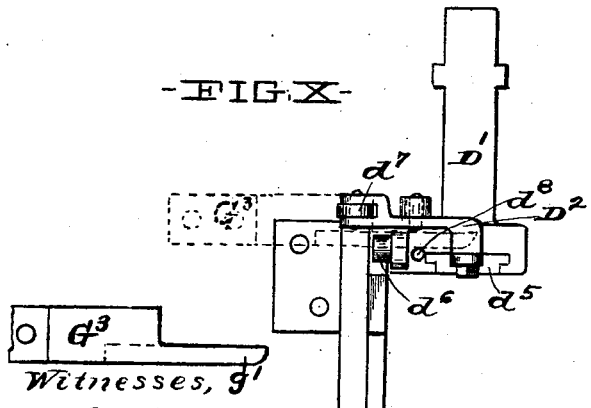
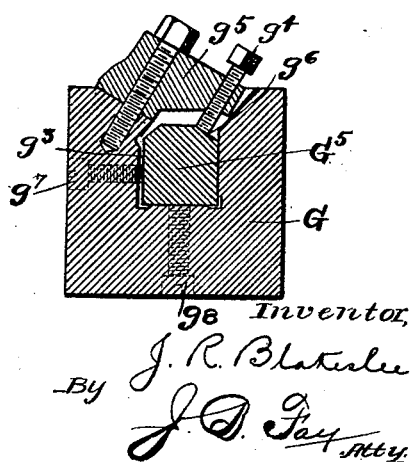

UNITED STATES PATENT OFFICE.

JOHN R. BLAKESLEE, OF GLENVILLE, OHIO, ASSIGNOR TO THE AJAX MANUFACTURING COMPANY, OF CLEVELAND, OHIO.

RIVET-MAKING MACHINE.

SPECIFICATION forming part of Letters Patent No. 680,217, dated August 13, 1901.

Application filed June 16, 1900. Serial No. 20,528. (No model.)

*To all whom it may concern:*

Be it known that I, JOHN R. BLAKESLEE, a citizen of the United States, and a resident of Glenville, county of Cuyahoga, and State of Ohio, have invented a new and useful Improvement in Rivet-Making Machines, of which the following is a specification, the principle of the invention being herein explained and the best mode in which I have contemplated applying that principle, so as to distinguish it from other inventions.

My invention relates to machines for making rivets; and it consists of means hereinafter fully described.

The annexed drawings and the following description set forth in detail certain means embodying the invention, such disclosed means constituting but one of various mechanical forms in which the principle of the invention may be used.

In said annexed drawings, Figure I represents a plan view of a rivet-making machine embodying my invention. Fig. II represents a side elevation of same viewed from the side and in the direction indicated by the arrow in Fig. I. Fig. III represents a side elevation of same viewed from the side and in the direction opposite that indicated by the arrow in Fig. I. Fig. IV represents a vertical cross-section of the machine, taken upon the plane indicated by lines 4 4, Fig. I, and viewed as indicated by the arrow upon the lower portion of said figure. Fig. V represents a vertical cross-section of the machine, taken upon the planes indicated by the lines 5 5, Fig. I, and viewed in a direction opposite that indicated by the arrow in the lower part of said figure, certain portions cut by such planes being omitted and certain portions so cut being shown in elevation in said two figures. Fig. VI represents a vertical longitudinal section of the invention, taken upon the plane indicated by line 6 6, Fig. I, showing certain portions cut by such plane in elevation and viewed in the direction opposite that indicated by the arrow in the upper part of said figure. Fig. VII represents an enlarged vertical longitudinal section of one end of the machine, taken upon the plane indicated by line 7 7, Fig. I, and viewed in the direction opposite that indicated by the arrow in said figure, parts cut by such plane being shown in elevation and the die-turret being shown in partial cross-section. Figs. VIII, IX, X, XI, and XII represent detail views.

Mounted upon a suitable bed or frame A, which is provided with suitable extensions, bosses, and bearings for receiving and supporting the various parts of the machine, is a turret or disk B, rotatably mounted upon a horizontal shaft $b$, which is secured in suitable supports $b'$ $b^2$, Fig. VI. Mounted upon said shaft and adjacent to the turret is a stationary back B', Fig. VI. Said turret is provided upon its periphery with a series of equidistant ratchet-teeth $b^3$, and upon each side of such teeth is formed a cylindrical surface $b^4$ and $b^5$, respectively. Such two surfaces form a journal for a strap C, Figs. IV and V, upon the upper portion of which is journaled one end of an arm C', the other end of which is journaled upon a reciprocable slide or blank-carrier D, whose direction of reciprocating movement is transverse with respect to the axis of rotation of said turret. Said slide is actuated by a connecting-rod $d$, which is actuated by means of a rack E and pinion E', Fig. I. Said pinion is secured to a disk $E^2$, which has a thrust-bearing against a bearing $e$, Figs. IV and V, which is formed in the frame of the machine, both pinion and disk being journaled upon the pin $e'$. The connecting-rod is suitably journaled upon a pin $e^2$, secured to the disk $E^2$. Such described construction permits excessive strains, which would otherwise be communicated to pin $e'$, to be transmitted to said thrust-bearing, and hence to the machine-frame, thereby insuring the perfect engagement of the rack and pinion. Said rack is connected with and actuated by a crank $E^3$ and a suitable connecting-rod and cross-head $E^4$ and $E^5$, respectively, as shown in Figs. I and II, said crank being secured upon a shaft F, which derives its motion from a driving-pulley F'.

The reciprocable slide D travels in suitable guideways formed in the frame and is provided with a pocket $d'$ for receiving a rivet-blank, Fig. IV. Said pocket is formed by three confining-walls, the first of which, $d^2$, is of semicylindrical concave formation, the axis of such cylinder being parallel with the axis of the turret, Fig. IV, and prevents displacement of the blank in one direction of reciprocatory movement of the blank-carrier D. One end edge of said cylindrical surface is formed by the cutting edge of a shear-blade $d^3$, Fig. V, and the end of the pocket opposite that at which said blade is located is closed by means of a vertically-movable wall $d^4$, which performs the function of a gage by preventing movement of the rivet-blank rod in one longitudinal direction of said pocket, as will hereinafter be described. Displacement in the other reciprocatory direction of said carrier is prevented by means of a slide $d^5$, forming a third wall, which is also vertically movable and is mounted in slideways formed or secured upon a spring-actuated yielding support D′, Fig. V, which, when the carrier is in the position farthest removed from the carrier-axis, as illustrated in said figure, is in lateral contact with a stop $a$, formed or secured upon the adjacent frame portion. The direction of yielding movement of said support is transverse with respect to the turret-axis—that is, is the same as the direction of reciprocatory movement of the carrier—and the location of said stop is such as to cause the support to yield and be held away some distance from the main portion of the carrier, as shown in said figure, when the carrier is in the position above mentioned, thereby causing the blank-pocket to be distended or of abnormal width in such position. The gage $d^4$ is mounted in suitable slide-bearings upon said support and has journaled upon its upper portion a roller $d^6$, whose axis lies transversely of the direction of reciprocatory movement of the carrier. Interposed in the path of said roller and secured to or formed upon the adjacent frame portion is an inclined plane $a'$, Fig. V, whose direction of inclination is upward in the direction toward the turret-axis, as shown. The amount of inclination is such as to cause the lowermost extremity of the gage to be located in a plane somewhat above the uppermost surface of a blank while resting in a carrier-pocket when the roller $d^6$ is riding upon the inclined plane and the said carrier is in the extreme position opposite that shown in Fig. V—that is, the position shown in Fig. IV. Such position of the gage is shown in Fig. IX, its lowermost position being shown in Fig. VIII. That portion of said gage immediately opposite the blank-pocket when in the position shown in Fig. VIII is of angular formation, formed with a slot and secured to the lower surface of the main-gage slide portion, whereby such angular portion may be adjusted toward and from such pocket and the length of the rivet-blanks, as will be further seen, varied.

A lever $D^2$ is fulcrumed upon the upper portion of the support D′, one end of which is journaled upon the upper end of the slide $d^5$, the other end thereof being free and provided with a roller $d^7$, having its axis in a line parallel with the direction of reciprocatory movement of the carrier, Fig. X. Secured to the said upper portion of the slide $d^5$ in an upright position is a pin $d^8$, located, as shown in Figs. IX and X, at a point intermediate of the lever $D^2$ and the outer end of the support D′.

Opposite the blank-pocket, when in the position illustrated in Fig. V and in the machine-frame, is an aperture $a^2$, Figs. VIII and IX, through which the blank bar or rod may be inserted and placed in the blank-pocket of the carrier.

A heading-tool slide G, Fig. VI, is mounted in suitable slide-bearings in the machine-frame and is reciprocable in a direction parallel with the turret-axis, deriving its motion from the main shaft F through the medium of a suitable connecting-rod $g$, journaled upon a suitable crank, as shown in said figure. Secured to the front of said slide are a heading-tool G′, an inserting-tool $G^2$, and an oil-swab $G^7$, having a location relatively to the turret hereinafter described. Upon the top of the slide is secured an angle-piece $G^3$ and provided upon its lower surface with a cam $G^4$, which has formed upon its lower surface laterally of the cam-surface a downwardly-projecting wall $g'$, abruptly ending at a point intermediate of the ends of the angle-piece and forming an opening $g^2$, Figs. VIII and IX, of sufficient height to permit the passage through it of the pin $d^8$ upon the carrier, as shown in Fig. IX. The operation of the carrier-slide and the heading-tool slide are timed in a manner such that said angle-piece will engage the carrier in a manner hereinafter described.

Arranged equidistantly from each other and from the turret-axis and having their axes parallel with the turret-axis are a series of solid one-piece dies $B^2$, whose respective bores are open at both ends, whereby communication may be had therewith from either side of said turret, Figs. VI and VII. A series of apertures equidistant from each other and from the line of the axis of rotation of the turret are formed in the stationary back B′, the length of the arc of a circle between adjacent apertures drawn through their axes being equal to that between the axes of adjacent dies, so that the turret may be given a position such that a number of such dies may be caused to be coaxial with a number of such apertures. Two of such apertures $b^6$ and $b^7$ extend through the back and register, respectively, with apertures $a^3$ and $a^4$, formed in the adjacent frame portion. (See Figs. VI and VII.) It is hence seen that the axes of the dies and apertures lie in straight lines which determine a cylindrical surface. Two apertures $b^8$ $b^8$, intermediate of apertures $b^6$ and $b^7$, are connected with a water-supply pipe H, as are also the apertures $b^9$ $b^9$, as shown in dotted lines in Fig. IV. The turret is provided with a bearing-surface $b^{11}$, Fig. VI, upon which bear two spring-brakes K K, Fig. V, and which prevent the turret from moving by virtue of its own inertia, as will be further described. Equidistant peripheral conical depressions $b^{12}$ are formed upon the turret periphery, Figs. V and VII, which are located in a manner such that one thereof is in the line of movement of a conical locking-bolt L, Fig. V, when the dies and apertures in the back are in alinement. Said bolt is connected with a lever L', which in turn is connected with a connecting-rod $L^2$, journaled upon the strap-arm C'. Pivoted upon the upper part of the strap C is a pawl $C^2$, adapted to engage the ratchet-teeth formed upon the periphery of the turret.

A reciprocatory slide N is mounted upon the rear end of the machine, Figs. I and VI, deriving its movement from a system of levers O and connecting-rod O', actuated by the driving-pulley, as is readily understood from the drawings, Fig. III. Secured in said slide is a plunger N', having its axis parallel with the direction of reciprocatory movement of slide N and coaxial with the axis of aperture $b^6$. Said plunger is of a length such that at the end of the reciprocatory stroke of the slide toward the turret its extremity may be caused to pass through aperture $b^6$ and enter a die-bore in alinement therewith, as shown in Fig. VI. Such plunger is adjustably secured to said slide, so that it may be adjusted in the direction of its axis. Such adjustable feature is secured by providing the end of the slide N with a semicylindrical depression $n$, Fig. XII, and providing the plunger with a cylindrical head $n'$, fitting in said depression. The outer end of said depression is made of a diameter equal to that of the body of the plunger and is provided with a removable cap $n^2$, secured to the slide by means of a screw. (Shown in dotted lines.) By loosening said cap the plunger may be adjusted in the direction of its axis, washers $n^3$ being interposed between the inner end of the plunger and the adjacent slide portion to form a back. The washers are preferably made with a slot adapted to fit over the plunger-body and interposed in the space between the head and cap, so that such space may be entirely filled, whereby movement in either direction of the plunger-axis may be prevented. A second slide P, Figs. I and VII, is operated in a manner similar to that in which slide L is operated, the arrangement of levers, however, being such that said slide is given a much longer stroke than is given slide L, whereby a plunger or ejector rod P', secured to slide P, may be caused to pass completely through or sufficiently into a die in alinement with the aperture $b^7$, as shown in Fig. VII. In order that such object may be accomplished, said rod is given a location such that its axis is parallel with the direction of reciprocatory movement of the slide P, and hence may be caused to be coaxial therewith. It is hence seen that the axes of the plunger N' and the "kickout-rod" P' also lie in the aforementioned cylindrical surface passing through the die-axes.

The heading-tool slide is provided with heading-tool support $G^5$, which is adjustable in the direction of movement of the slide and also in a direction transverse with relation thereto, the heading-tool itself being secured to such support in any suitable manner. Said slide is provided with a longitudinal opening $g^3$, in which said support is placed, the said opening being of greater length than as shown in Fig. IX and of greater width than said support, as shown in Fig. XI. Said support is secured against longitudinal movement by means of a wedge $G^6$ and a screw $g^4$, supported by an angular gib $g^5$, which permits of vertical movement of the support in said aperture, such screw bearing diagonally upon an inclined surface $g^6$, formed upon said support. Two additional screws $g^7$ and $g^8$ fix the lateral position of said support. It is hence seen that by proper manipulation of screws $g^4$, $g^7$, and $g^8$ the heading-tool may be adjusted laterally or vertically. Manipulation of the wedge $G^6$ may be caused to produce or permit of longitudinal movement, whereby longitudinal adjustment may be obtained. The screws $g^7$ and $g^8$ may be dispensed with by the use of "liners" of thin sheet metal. Such liners when used are placed beneath the support $G^5$ and adjacent to the side farthest from the surface $g^6$, so as to approximately obtain the desired position somewhat above and to the right (as illustrated) of the required exact position. Manipulation of the one screw $g^4$ may then be caused to give such required exact position, as is readily seen. The swab $G^7$, Figs. VIII and IX, is placed in a position parallel with the heading-tool G' and is secured to the slide G in a position such that its axis is located upon the same line with that of a die $b^{10}$ when the turret is stationary and when such die is located at a point intermediate of the sphere of action of the ejector and inserter preferably at a point preceding that at which such die enters the sphere of action of said inserter. Suitable means—such as an oil-reservoir Q, Fig. II—are provided for supplying such swab continuously with oil. The swab-axis thus also lies in the cylindrical surface determined by the die-axes and the inserter, heading-tool, and ejector-axes.

Having described the construction of the machine, I shall now describe its operation. The driving-pulley being revolved, the heading-tool slide, the blank-carrier, and the slides N' and P' are simultaneously reciprocated and coact, as will be described. The reciprocation of the carrier-slide effects the intermittent partial rotation of the turret, as is readily understood from the described construction, the strap C performing the function of a guide for the pawl $C^2$. When the carrier is in its extreme position farthest removed from the turret, the heated bar or rod from which the rivet-blanks are to be cut is inserted through the aperture $a^2$ into the blank-pocket $d'$ of the carrier, such insertion being limited by the gage $d^4$ at the farther end and being facilitated by the distended condition thereof. The carrier-slide now advancing, the shear-blade cuts the inserted rod portion from the bar, at the completion of which operation the yielding support D' and the main part of the slide have closed upon one another, clamping the blank firmly between them and preventing displacement in either direction of reciprocation, thereby maintaining the blank-axis in a position parallel with the axes of the dies in the turret. The advance of the carrier being continued, the blank is transported to a point at which the line of its axis passes through the circumference of a circle described by a fixed point in a die-axis. During such movement of the carrier the turret has been rotated through one arc of rotation in a manner such as to cause one die-axis to be brought into the line of axis of said blank, the bolt-lock L having at the same time been caused to engage a depression $b^2$, thereby locking the turret against rotation. Such locking insures the exact alinement of said two axes for a time sufficiently long to permit of the insertion of the blank into a die, as will be further described, the brakes K K preventing, as before mentioned, any rotative movement resulting from the momentum of the turret acquired by the partial rotation just preceding, thereby insuring the engagement of the locking-bolt and the conical depression. Meanwhile, however, the heading-tool slide has approached the turret, thus advancing both the inserter and heading-tool, the axes of each of which are during the period of rest of the turret, which is maintained until the next advance movement of the carrier, also in alinement with the axes of two dies, respectively, that opposite which the blank has been transported and that adjacent to it in the direction of rotation, such position being shown in Fig. IV. The gage $d^4$ having been moved upwardly as a result of the engagement of the roller $d^6$ with the inclined plane $a'$, the inserting-rod has been permitted to enter the blank-pocket, eject the blank therefrom, and insert it into the die. While such insertion has been taking place the carrier has started upon its return reciprocal stroke, and in order not to displace the blank by the contact of the movable wall $d^5$ the support D has been caused to yield and remain stationary until the completion of the inserting operation. This has been accomplished by the engagement of the wall $g'$, formed upon the cam $G^4$, with the pin $d^8$, such wall having been inserted behind such pin, as indicated in dotted lines in Fig. X, thus causing said support to yield, so as not to be withdrawn with the carrier-slide. The advance of the heading-tool slide now continuing to complete the inserting operation, said pin reaches the opening $g^2$, Fig. IX, and the support is quickly withdrawn, rejoining the carrier on its return stroke. Before such action has been effected, however, the cam $G^4$ has engaged the lever $D^2$ to lift the slide $d^5$, as shown in Fig. IX, whereby such rejoining is permitted, the said slide thus escaping engagement with the inserter-rod $G^2$, which has now just completed the inserting operation. During such return stroke of the carrier and the yielding support the sliding wall $d^5$ and the gage $d^4$ return to their normal positions. Near the latter part of such stroke said yielding member comes into contact with the stop $a$, thus distending the blank-pocket and placing same in the same condition as at the beginning of the above-described operation. A repetition of the said operation now brings the axis of the inserted blank upon the line of axis of the heading-tool. Simultaneously with the advance of the heading-tool slide toward the turret occurs the advance of the slide N toward said turret from the opposite direction, carrying with it the plunger N'. The two tools approach the die until the plunger reaches the end of its stroke, which point is predetermined and depends upon the length of the blank or the required rivet. Near the end of the respective strokes of plunger and heading-tool the latter comes into contact with the adjacent projecting end of the blank, compressing and shaping such end into the form of the required head. In this operation it is assisted by the plunger N', which has meanwhile entered the end of the die opposite that within the sphere of action of the heading-tool. Both tools are thereupon withdrawn prior to the next partial rotation of the turret, which now follows. Such partial rotation and that following bring the inner end of the die into successive communication with each of the apertures $b^8$, from each of which is delivered a stream of water upon the inner rivet end for cooling purposes. The next partial rotation brings the die-axis upon the line of the axis of the ejector-rod P', which ejects the finished rivet from the turret. The following three partial rotations bring the same die successively into communication with the apertures $b^9$, each of which discharge water through said die, thus effectually cooling it, so as to resume its normal diameter. The following movement brings the die into communication with the oiling-swab for lubricating the die interior for facilitating the insertion of the blank, which follows the oiling operation. Each die participates in the same series of operations, so that a blank is inserted in a die. A heading operation and an ejecting operation are effected during each revolution of the driving-pulley.

It is seen then that by the above-described means and operation a blank is automatically cut, transported opposite a solid die, automatically inserted therein, then moved into the sphere of action of a heading-tool, and subsequently ejected in a finished condition.

By providing the cooling device at a point intermediate of the spheres of action of the heading-tool and ejector and injecting the water into the rear end of the die the end of the rivet which is engaged by the ejector is cooled sufficiently so that the latter will not cause such rivet end to become upset and become jammed in the die, thus insuring the proper operation of the ejecting device. Water being injected completely through the die subsequently to the ejecting operation, all scale which may remain in the die after such operation is washed out and the die-bore effectually cleaned, as well as thoroughly cooled.

Other modes of applying the principle of my invention may be employed instead of the one explained, change being made as regards the mechanism herein disclosed provided the means covered by any one of the following claims be employed.

I therefore particularly point out and distinctly claim as my invention—

1. In a rivet-making machine, the combination of a rotatable die-support, a series of equidistant dies arranged upon the circumference of a circle having its center upon the axis of rotation of said support, a reciprocating blank-carrier adapted to intermittently and partially rotate said support, means for feeding blanks from said carrier into said dies and acting at a fixed point in the rotative path of said support, and a heading-tool acting at a second such point, substantially as set forth.

2. In a rivet-making machine, the combination of a rotatable die-support, a series of equidistant dies arranged upon the circumference of a circle having its center upon the axis of rotation of said support, a reciprocating blank-carrier having its path of movement located transversely of the axis of rotation of said support and provided with means for securing a blank against displacement in the direction of such reciprocal movement, feeding means mounted upon a reciprocal support adapted to eject such blank from said carrier and insert same into a die, said support provided with means for actuating said blank-securing means to release the inserting means whereby said carrier may be released, substantially as set forth.

3. In a rivet-making machine, the combination of a rotatable turret provided with a series of dies equidistant from each other and from the turret-axis, having their axes parallel with the latter and being open to communication at both ends, a series of tools having their axes located in different lines in the cylindrical surface passing through the die-axes, and consisting of a blank-inserting tool, a heading-tool, an ejector and a plunger, the axis of the latter located in the same straight line with the heading-tool axis and upon the side of said turret opposite that upon which said heading-tool is located, a carrier for carrying blanks into the line of action of said inserter, said tools and plunger connected so as to respectively act within the sphere of each die consecutively, and means for intermittently and partially rotating said turret, substantially as set forth.

4. In a rivet-making machine, the combination of a rotatable turret provided with a series of dies equidistant from each other and from the turret-axis and having their axes parallel with the latter, means for intermittently and partially rotating said turret through an arc of a circle equal to that between the axes of two consecutive dies, an inserter having a reciprocatory movement parallel with said turret-axis, the axis of said inserter located upon the line passing through a die-axis when said turret is at rest, a blank-carrier having a reciprocatory movement in a direction transverse to that of the turret-axis and provided with a pocket for receiving a blank, said pocket having three confining-walls adapted to secure such blank against displacement in the direction of both reciprocatory movements of said carrier and in one direction of the blank-axis, such wall effecting non-displacement in the last-described direction being movable, whereby said inserter is permitted to enter said pocket eject the blank therefrom, and means for moving said wall, substantially as set forth.

5. In a rivet-making machine, the combination with a blank-carrier, of means for reciprocating same, said carrier provided with a pocket for the reception of a rivet-blank and provided with a gage at one end movable in a direction transverse with respect to the longitudinal direction of the pocket, substantially as set forth.

6. In a rivet-making machine, the combination with a blank-carrier, of means for reciprocating same, said carrier provided with a pocket for the reception of a rivet-blank and provided with walls adapted to prevent displacement in the direction of reciprocation, one of such walls being movable in a direction transverse with respect to such direction, substantially as set forth.

7. In a rivet-making machine, the combination with a blank-carrier, of means for reciprocating same, said carrier provided with a pocket for the reception of a rivet-blank provided with walls adapted to prevent displacement in the direction of reciprocation, one of such walls being movable in a direction transverse with respect to and capable of yielding in the direction of such movement, substantially as set forth.

8. In a rivet-making machine, the combination of a blank-carrier, means for reciprocating same, said carrier provided with a pocket for the reception of a rivet-blank and with a gage at one end slidably mounted, and an inclined plane secured to or formed upon the machine-frame, said gage provided with a roller for engaging such plane whereby said gage may be moved in its slideways upon the reciprocation of said carrier, substantially as set forth.

9. In a rivet-making machine, the combination with a reciprocating blank-carrier, of a reciprocating heading-tool slide, said carrier provided with a pocket for the reception of a rivet-blank provided with walls adapted to prevent displacement of such blank in the direction of reciprocation, one such wall being slidably mounted upon a spring-actuated support, said heading-tool slide provided with means for actuating said wall in its slide-bearings and for causing said spring-actuated support to yield, whereby such support may be arrested and held stationary during a part of the reciprocation of the carrier, substantially as set forth.

10. In a rivet-making machine, the combination of a rotatable turret provided with a series of dies arranged equidistantly from its axis of rotation, a reciprocating carrier for transporting a rivet-blank opposite such dies, a pawl engaging the periphery of said turret connected with and actuated by said carrier to periodically rotate same through successive arcs of rotation, substantially as set forth.

11. In a rivet-making machine, the combination of a rotatable turret provided with a series of dies arranged equidistantly from its axis of rotation, a reciprocating carrier for transporting a rivet-blank opposite such dies, a pawl engaging the periphery of said turret connected with and actuated by said carrier and means for locking said turret during one reciprocal movement of said carrier, substantially as set forth.

12. In a rivet-making machine, the combination of a rotatable turret provided with a series of dies, a reciprocating carrier for transporting a rivet-blank opposite such dies, a pawl engaging the periphery of said turret connected with and actuated by said carrier and a bolt for engaging recesses in said turret's periphery connected with and actuated by said carrier, whereby said turret may be locked against rotative movement during one reciprocatory movement of said carrier, substantially as set forth.

13. In a rivet-making machine, the combination of a rotatable turret provided with a series of dies having their axes parallel with the turret's axis of rotation and located equidistantly from each other and from said turret-axis, means for periodically rotating said turret through successive arcs each equal to that between successive die-axes and taken upon the circumference of a circle described by a fixed point upon one such axis, a stationary portion adjacent to said turret provided with a series of bores located equidistantly from the line of the turret-axis and from each other in a manner such as to cause them to be coaxial with the die-bores when said turret is stationary, and water connections communicating with said bores whereby water may be injected into same, substantially as set forth.

14. In a rivet-making machine, the combination of a die-support, a die in said support, a heading-tool and means for actuating same, an ejector and means for actuating same, means for moving said support from the sphere of action of said heading-tool to that of said ejector, and means located intermediately of said spheres for cooling the interior of said die, substantially as set forth.

15. In a rivet-making machine, the combination of a die-support, a die in said support open to communication at both ends, a heading-tool and means for actuating same, an ejector and means for actuating same, means for moving said support from the sphere of action of the heading-tool into that of said ejector, and means located intermediately of said spheres for injecting water into the said die whereby the inner end of the rivet may be cooled, substantially as set forth.

16. In a rivet-making machine, the combination of a series of dies mounted in a rotatable die-support and means for actuating the latter to cause said dies to traverse a fixed cycle, an inserter, heading-tool and ejector located and operating at different successive points in said cycle, and means for injecting water through said dies located in said cycle intermediately of the ejector and inserter, substantially as set forth.

17. In a rivet-making machine, the combination of a series of dies mounted in a rotatable die-support and means for actuating the latter to cause said dies to traverse a fixed cycle, an inserter, heading-tool and ejector located and operating at different successive points in such cycle, and means located in said cycle intermediately of said ejector and inserter for oiling the die-bore, substantially as set forth.

18. In a rivet-making machine, the combination of a series of dies mounted in a rotatable die-support, means for intermittently actuating said support to successively bring each die to a fixed point, an oil-swab, and means for actuating said swab to enter each die at such point whereby each die-bore may be oiled, substantially as set forth.

19. The combination of a tool-slide provided with a recess for receiving a tool-support, said recess being of a width and depth greater than the width and height respectively of said support, of a gib secured to said slide having an angularly-placed screw passing therethrough bearing diagonally upon said support, substantially as set forth.

Signed by me this 20th day of April, 1900.

JOHN R. BLAKESLEE.

Attest:
D. T. DAVIES,
A. E. MERKEL.